US012592612B2

(12) United States Patent
Vitikac et al.

(10) Patent No.: US 12,592,612 B2
(45) Date of Patent: Mar. 31, 2026

(54) SYSTEM FOR DAMPING UNWANTED MOTOR MOVEMENT

(71) Applicant: HONEYWELL INTERNATIONAL INC., Charlotte, NC (US)

(72) Inventors: Martin Vitikac, Brno (CZ); Michal Jasansky, Brno (CZ); Ronald Vaughan, Chandler, AZ (US); Antonin Skarolek, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 184 days.

(21) Appl. No.: 18/453,002

(22) Filed: Aug. 21, 2023

(65) Prior Publication Data

US 2025/0070615 A1      Feb. 27, 2025

(51) Int. Cl.
| | |
|---|---|
| *H02K 7/106* | (2006.01) |
| *B64C 13/50* | (2006.01) |
| *H02K 7/116* | (2006.01) |
| *H02K 11/30* | (2016.01) |

(52) U.S. Cl.
CPC ............. *H02K 7/106* (2013.01); *B64C 13/50* (2013.01); *H02K 7/116* (2013.01); *H02K 11/30* (2016.01)

(58) Field of Classification Search
CPC ........ H02K 7/106; H02K 11/30; H02K 7/116; B64C 13/50
See application file for complete search history.

(56) References Cited

U.S. PATENT DOCUMENTS

| | | | |
|---|---|---|---|
| 4,568,863 | A | 2/1986 | Ruof |
| 5,892,341 | A | 4/1999 | Chmiel |
| 7,456,594 | B2 | 11/2008 | Pottter et al. |
| 7,621,117 | B2 | 11/2009 | Dooley et al. |
| 7,849,668 | B2 | 12/2010 | Sheridan |
| 8,076,876 | B2 | 12/2011 | Lundell |
| 2018/0069493 | A1 | 3/2018 | Roberts |
| 2021/0091687 | A1* | 3/2021 | Obermann ................ H02P 3/22 |
| 2022/0077805 | A1* | 3/2022 | Wang .................... H02P 29/025 |
| 2022/0200503 | A1* | 6/2022 | Popek ..................... B64C 13/50 |
| 2023/0050006 | A1* | 2/2023 | Pickerill ................... A61F 2/70 |
| 2024/0348190 | A1* | 10/2024 | Bernard ................. H02P 29/00 |

FOREIGN PATENT DOCUMENTS

| | | |
|---|---|---|
| DE | 2834989 A1 | 2/1980 |
| EP | 4020789 A1 | 6/2022 |
| WO | 2015098942 A1 | 7/2015 |

* cited by examiner

*Primary Examiner* — Zoheb S Imtiaz

(74) *Attorney, Agent, or Firm* — Ingrassia Fisher and Lorenz LLP

(57) ABSTRACT

An electric motor system, which may be included in an aircraft, includes a multi-phase motor, a multi-phase inverter circuit, and a plurality of motor brake switches. The multi-phase inverter circuit is coupled to each phase of the multi-phase stator and is adapted to be coupled to a high-side voltage node and a circuit common node. Each motor brake switch is associated with, and is connected in series between, the circuit common node and a different one of the phases. Each motor brake switch is configured to be in an open state when energized and in a closed state when deenergized. When the motor brake switches are in the open state, the motor brake switches do not connect the associated phases to the circuit common node, and when the motor brake switches are in the closed state, the motor brake switches connect the associated phases to the circuit common node.

10 Claims, 4 Drawing Sheets

SYSTEM FOR DAMPING UNWANTED MOTOR MOVEMENT

TECHNICAL FIELD

The present disclosure relates to unwanted motor movement and, more specifically, to a system for damping unwanted motor movement when unpowered, especially with regard to aircraft flight control surfaces when parked on-ground or during in-flight aircraft operation.

BACKGROUND

In the emerging urban air mobility (UAM)/light aircraft market, as well as some regional and larger commercial aircraft markets, the aircraft are electrically operated and, when on the ground and unpowered, can be susceptible to gust loads on the control surfaces. Thus, there is a need to provide a means for dampening the movement of the control surfaces against these gust loads during on-ground, unpowered conditions. In addition to on-ground, unpowered conditions, there may be times when it is desirable to dampen the movement of an unpowered system for one or more control surfaces during in-flight operations.

There are various challenges associated with implementing control surface dampening in the above-mentioned aircraft markets. For example, the mechanism used should not continuously draw current from the aircraft batteries. The mechanism should also be lightweight and relatively small. It should also preferably be a relatively low-cost solution. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an electric motor system includes a multi-phase motor, a multi-phase inverter circuit, and a plurality of motor brake switches. The multi-phase motor has a multi-phase stator and a rotor. Each phase of the multi-phase stator is configured to be selectively energized to thereby generate a rotating magnetic field that causes the rotor to rotate. The multi-phase inverter circuit is coupled to each phase of the multi-phase stator and is adapted to be coupled to a high-side voltage node and a circuit common node. The multi-phase inverter circuit is configured to selectively couple each phase of the multi-phase stator in series between the high-side voltage node and the circuit common node. Each motor brake switch is associated with, and is connected in series between, the circuit common node and a different one of the phases. Each motor brake switch is configured to be in an open state when energized and in a closed state when deenergized. When the motor brake switches are in the open state, the motor brake switches do not connect the associated phases to the circuit common node, and when the motor brake switches are in the closed state, the motor brake switches connect the associated phases to the circuit common node.

In another embodiment, a flight control surface movement and damping control system includes a flight control surface and an electric motor system. The flight control surface is coupled to receive a drive torque and, in response to the drive torque, to move to a flight control surface position. The electric motor system is coupled to the flight control surface and is configured to selectively supply the drive torque to the flight control surface. The electric motor system includes a multi-phase motor, a multi-phase inverter circuit, and a plurality of motor brake switches. The multi-phase motor has a multi-phase stator and a rotor. Each phase of the multi-phase stator is configured to be selectively energized to thereby generate a rotating magnetic field that causes the rotor to rotate and supply the drive torque. The multi-phase inverter circuit is coupled to each phase of the multi-phase stator and is adapted to be coupled to a high-side voltage node and a circuit common node. The multi-phase inverter circuit is configured to selectively couple each phase of the multi-phase stator in series between the high-side voltage node and the circuit common node. Each motor brake switch is associated with, and is connected in series between, the circuit common node and a different one of the phases. Each motor brake switch is configured to be in an open state when energized and in a closed state when deenergized. When the motor brake switches are in the open state, the motor brake switches do not connect the associated phases to the circuit common node, and when the motor brake switches are in the closed state, the motor brake switches connect the associated phases to the circuit common node.

In yet another embodiment, in an aircraft having a flight control system that includes a flight control surface and an electric motor system coupled to the flight control surface, and wherein the electric motor system includes: (i) a multi-phase motor having a multi-phase stator and a rotor, each phase of the multi-phase stator configured to be selectively energized to thereby generate a rotating magnetic field that causes the rotor to rotate and supply a drive torque to the flight control surface; (ii) a multi-phase inverter circuit coupled to each phase of the multi-phase stator, the multi-phase inverter circuit adapted to be coupled to a high-side voltage node and a circuit common node, the multi-phase inverter circuit configured to selectively couple each phase of the multi-phase stator in series between the high-side voltage node and the circuit common node; and (iii) a plurality of motor brake switches, each motor brake switch associated with, and connected in series between, the circuit common node and a different one of the phases, each motor brake switch configured to be in an open state when energized and in a closed state when deenergized, a method to selectively damp movement of the flight control surface includes the steps of: selectively energizing the motor brakes switches, whereby the motor brake switches are in the open state and do not connect the associated phases to the circuit common node, and selectively deenergizing the motor brake switches, whereby the motor brake switches are in the closed state and connect the associated phases to the circuit common node, thereby damping movement of the flight control surface.

Furthermore, other desirable features and characteristics of the flight control surface movement and damping control system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
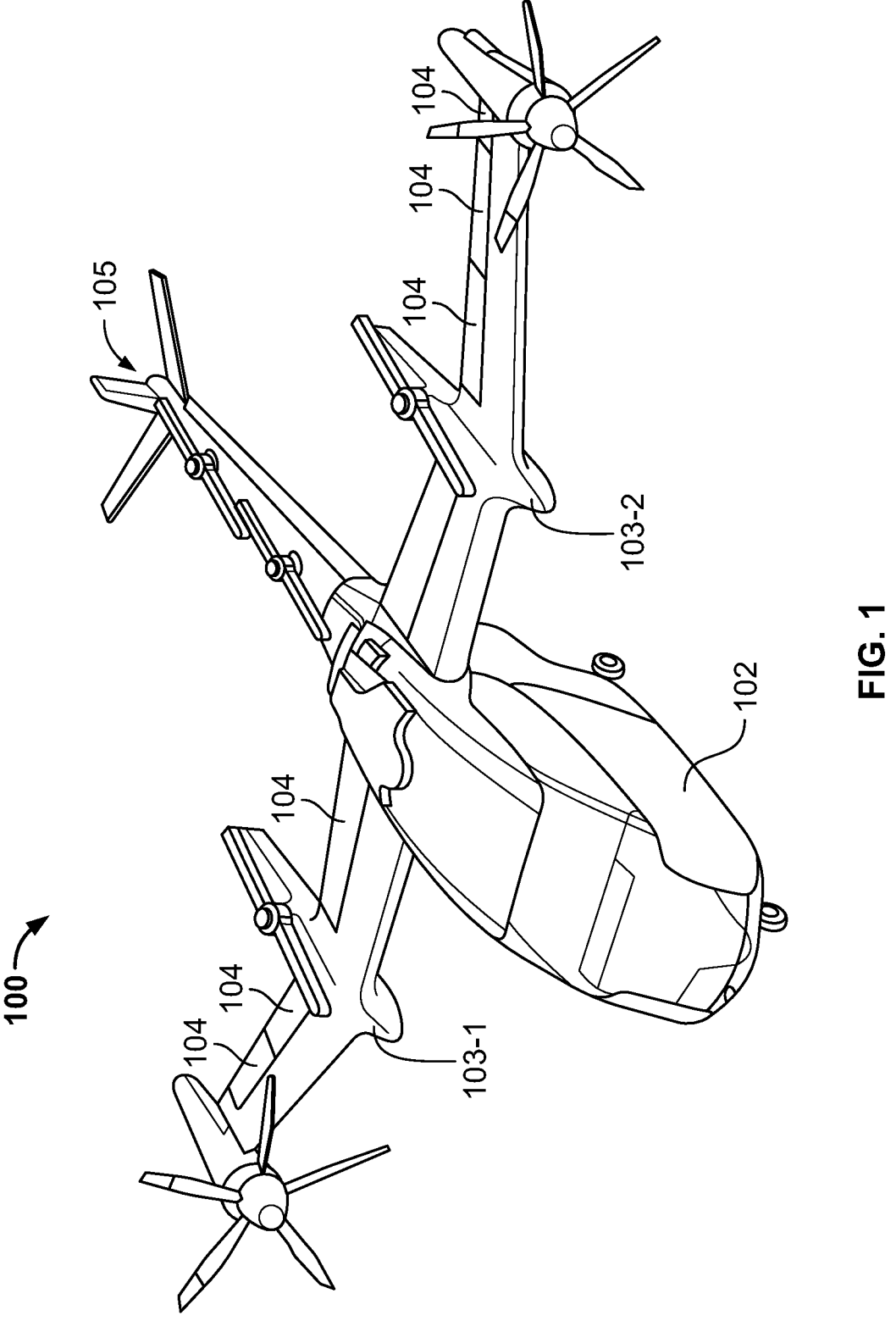
FIG. 1 depicts a perspective view of one embodiment of an aircraft.

Referring first to FIG. 1, a perspective view of one embodiment of an aircraft 100 is depicted. It will be appreciated that the aircraft 100 may be configured as any one of numerous types of aircraft, such as a helicopter, an airplane, or a UAV aircraft. In the depicted embodiment, however, the aircraft 100 is configured as a UAM aircraft and includes a fuselage 102 and a plurality of flight control surfaces 104. The flight control surfaces 104 are movably mounted on wings 103 (103-1, 103-2) that are coupled to the fuselage 102. In some embodiments, one or more flight control surfaces 104 may also be movably mounted on the empennage 105. Each flight control surface 104 is coupled to receive a drive torque and, in response to the drive torque, moves to a flight control surface position.

Figure 2:
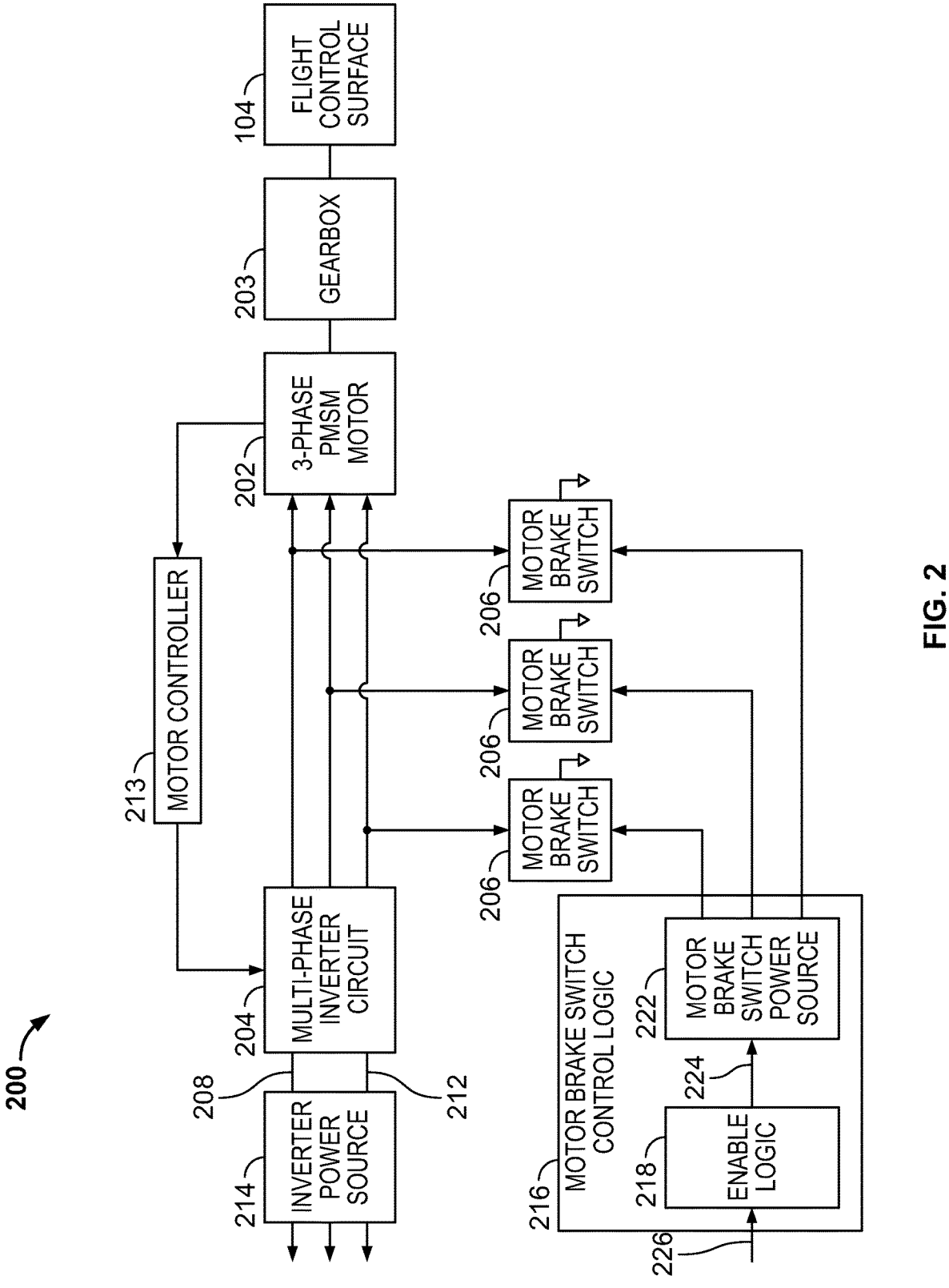
FIG. 2 depicts a functional block diagram of one embodiment a portion of a flight control surface movement and damping control system that may be implemented in the aircraft of FIG. 1.

Though not depicted in FIG. 1, each flight control surface 104 selectively receives the drive torque from, and is thus moved to a flight control surface position via, an electric motor system. As will be described momentarily, the electric motor system not only implements flight control surface movement, it also selectively implements flight control surface movement damping. A functional block diagram of one embodiment of a motor control system for a single flight control surface 104 is depicted in FIG. 2 and will now be described.

Figure 3:
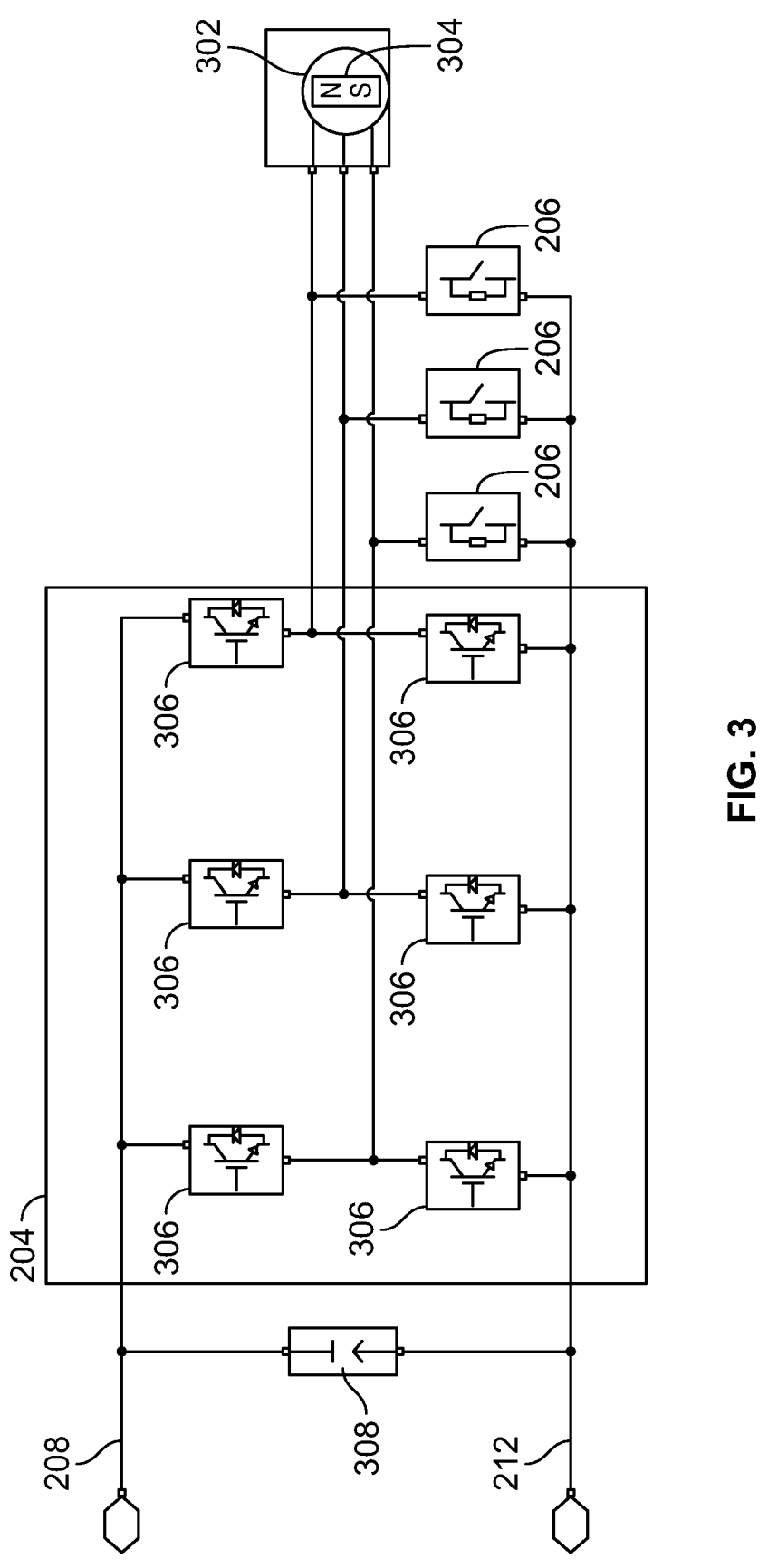
FIGS. 3 and 4 depict schematic diagrams of a portion of an electric motor system when in a non-damping mode and a damping mode, respectively.

The electric motor system 200 is disposed at least partially on or within various portions of the aircraft 100. For example, all or portions of the electric motor system 200 may be disposed within one or more of the fuselage 102, the wing 103, or the empennage 105. The electric motor system 200 is coupled to, and is configured to selectively supply the drive torque to, the flight control surface 104. To implement this functionality, the electric motor system 200 includes a multi-phase motor 202, a multi-phase inverter circuit 204, and a plurality of motor brake switches 206. The multi-phase motor 202, as depicted in FIG. 3, includes a multi-phase stator 302 and a rotor 304. Each phase of the multi-phase stator 302 is configured to be selectively energized, via the multi-phase inverter circuit 204, to thereby generate a rotating magnetic field. The rotating magnetic field in turn causes the rotor 304 to rotate and supply the drive torque to the flight control surface 104.

In the depicted embodiment, it is seen that the drive torque is supplied to the flight control surface 104 via a gearbox 203 that is coupled between the multi-phase motor 202 and the flight control surface 104. It will be appreciated that in other embodiments, the gearbox 203 may not be included. It will additionally be appreciated that the multi-phase motor 202 may be implemented using any one of numerous types of multi-phase motors. In the depicted embodiment, however, the multi-phase motor 202 is implemented using a 3-phase permanent magnet synchronous motor (PMSM).

The multi-phase inverter circuit 204 is coupled to each phase of the multi-phase stator 302. The multi-phase inverter circuit 204 is coupled to a high-side voltage node 208 and a circuit common node 212. In this regard, and as FIG. 2 also depicts, an inverter power source 214 is electrically coupled to the high-side voltage node 208 and the circuit common node 212. The inverter power source 214 supplies DC voltage to the multi-phase inverter circuit 204, which converts the DC voltage to multi-phase AC voltage and supplies the multi-phase AC voltage to the multi-phase motor 202. More specifically, the multi-phase inverter circuit 204, as is generally known, is configured to selectively couple each phase of the multi-phase stator 302 in series between the high-side voltage node 208 and the circuit common node 212.

It will be appreciated that the multi-phase inverter circuit 204 may be implemented using any one of numerous known inverter circuit topologies. In the depicted embodiment, however, and as shown in FIGS. 3 and 4, the multi-phase inverter circuit 204 is implemented using a 3-phase inverter circuit that comprises six power transistors 306, which are controllably switched, via a motor controller 213 (see FIG. 2), to selectively couple each phase of the multi-phase stator 302 in series between the high-side voltage node 208 and the circuit common node 212.

Figure 4:
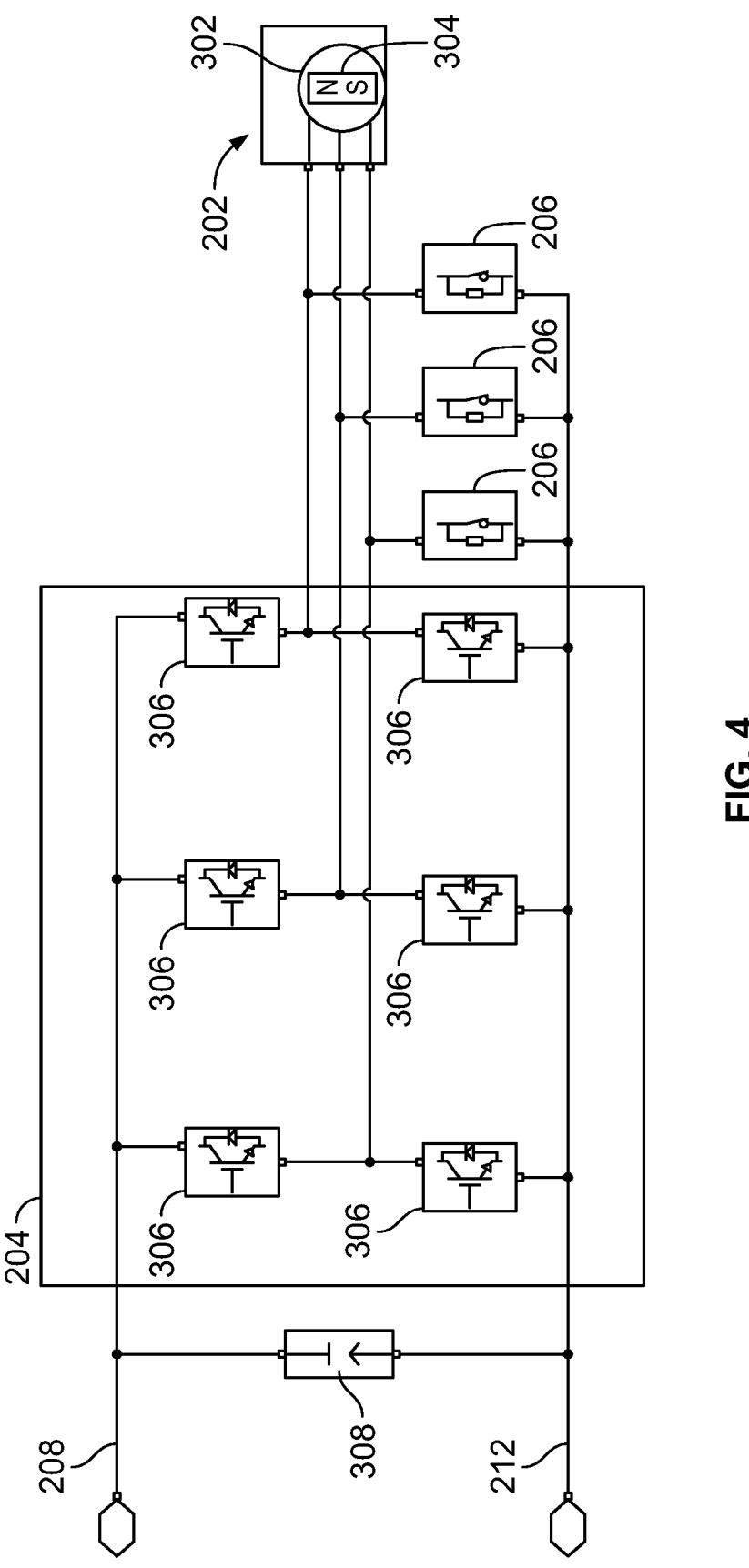

Before proceeding further, it is noted that the multi-phase inverter circuit 204 depicted in FIGS. 3 and 4 additionally includes a DC link capacitor 308. When included, the DC link capacitor 308, as is generally known, filters and smooths out the DC voltage between the high-side voltage node 208 and the circuit common node 212.

Each of the motor brake switches 206 is associated with, and is connected in series between, the circuit common node 212 and a different one of the phases of the multi-phase motor 202. Each motor brake switch 206 is configured to be in an open state when it is energized, and to be in a closed state when it is deenergized. When the motor brake switches 206 are in the open state, which is the state depicted in FIG. 3, the motor brake switches 206 do not connect the associated phases to the circuit common node 212. However, when the motor brake switches are in the closed state, which is the state depicted in FIG. 4, the motor brake switches 206 connect the associated phases to the circuit common node 212. It will be appreciated that the motor brake switches 206 may be implemented using any one of numerous known types of switches that implement this functionality. For example, the motor brake switches 206 could be implemented using any one of numerous known types of depletion mode transistors, such as, for example, junction field effect transistors (JFETs), SiC FETs, or metal-oxide semiconductor field effect transistors (MOSFETs), just to name a few. In the depicted embodiment, however, each motor brake switch 206 is a depletion mode MOSFET.

Regardless of how the motor brakes switches 206 are specifically implemented, it is generally known that when the phases of the multi-phase motor 202 are connected to the circuit common node 212, any motor back EMF generated by unwanted movement of the multi-phase motor 202 will be damped. This unwanted movement can result from, for example, wind gusts acting on the flight control surface 104 when the aircraft 100 is on the ground and the associated electric motor system 200 is deenergized. The unwanted movement can also result from aerodynamic forces acting on the flight control surface when the aircraft 100 is in flight and the associated electric motor system 200 is deenergized. Thus, as used herein, the electric motor system 200 and flight control surface 104 may also be referred to as a flight control surface movement and damping control system.

As FIG. 2 also depicts, the electric motor system 200, at least in the depicted embodiment, additionally includes motor brake switch control logic 216. The motor brake switch control logic 216 is electrically coupled to each motor brake switch 206 and is configured to selectively energize and de-energize each motor brake switch 206. Although the motor brake switch control logic 216 may be variously configured to implement this functionality, in the depicted embodiment it includes enable logic 218 and a motor brake switch power source 222. The enable logic 218 is configured to selectively supply a power source enable signal 224. More specifically, the enable logic 218 is adapted to receive an enable signal 226 and is configured to selectively supply the power source enable signal 224. Even more specifically, the enable logic 218 is configured such that when the enable signal 226 is supplied to the enable logic 218, the enable logic 218 supplies the power source enable signal 224. Conversely, when the enable signal 226 is not supplied to the enable logic 218, the enable logic 218 does not supply the power source enable signal 224.

The motor brake switch power source 222 is coupled to receive the power source enable signal 224 from the enable logic 218 and is electrically coupled to each of the motor brake switches 206. The motor brake switch power source 222 is configured, in response to receiving the power source enable signal 224, to energize each motor brake switch 206. The motor brake switch power source 222 is further configured, in response to not receiving the power source enable signal 224, to deenergize each motor brake switch 206. Thus, when the enable logic 218 is supplying the power source enable signal 224, the motor brake switches 206 are in the open state and thus do not connect the associated phases to the circuit common node 212.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electric motor system, comprising:
a multi-phase motor having a multi-phase stator and a rotor, each phase of the multi-phase stator configured to be selectively energized to thereby generate a rotating magnetic field that causes the rotor to rotate;
a multi-phase inverter circuit coupled to each phase of the multi-phase stator, the multi-phase inverter circuit adapted to be coupled to a high-side voltage node and a circuit common node, the multi-phase inverter circuit configured to selectively couple each phase of the multi-phase stator in series between the high-side voltage node and the circuit common node; and
a plurality of motor brake switches, each motor brake switch configured to be in an open state when energized and in a closed state when deenergized,
wherein:
each motor brake switch consists of only a depletion mode transistor,
each motor brake switch is directly connected in series between the circuit common node and a different one of the phases,
when the motor brake switches are in the open state, the motor brake switches do not connect the associated phases to the circuit common node, and
when the motor brake switches are in the closed state, the motor brake switches connect the associated phases to the circuit common node.

2. The electric motor system of claim 1, further comprising motor brake switch control logic electrically coupled to each motor brake switch and configured to selectively energize and de-energize each motor brake switch.

3. The electric motor system of claim 2, wherein the motor brake switch control logic comprises:
enable logic configured to selectively supply a power source enable signal; and
a motor brake switch power source coupled to receive the power source enable signal from the enable logic and electrically coupled to each of the motor brake switches, the motor brake switch power source configured, in response to receiving the power source enable signal, to energize each motor brake switch.

4. The electric motor system of claim 1, further comprising an inverter power source electrically coupled to the high-side voltage node and the circuit common node.

5. A flight control surface movement and damping control system, comprising:

a flight control surface coupled to receive a drive torque and, in response to the drive torque, to move to a flight control surface position; and an electric motor system coupled to the flight control surface, the electric motor system configured to selectively supply the drive torque to the flight control surface and including:

a multi-phase motor having a multi-phase stator and a rotor, each phase of the multi-phase stator configured to be selectively energized to thereby generate a rotating magnetic field that causes the rotor to rotate and supply the drive torque;

a multi-phase inverter circuit coupled to each phase of the multi-phase stator, the multi-phase inverter circuit adapted to be coupled to a high-side voltage node and a circuit common node, the multi-phase inverter circuit configured to selectively couple each phase of the multi-phase stator in series between the high-side voltage node and the circuit common node; and a plurality of motor brake switches, each motor brake switch configured to be in an open state when energized and in a closed state when deenergized, wherein:

each motor brake switch consists of only a depletion mode transistor, each motor brake switch is directly connected in series between the circuit common node and a different one of the phases, when the motor brake switches are in the open state, the motor brake switches do not connect the associated phases to the circuit common node, and when the motor brake switches are in the closed state, the motor brake switches connect the associated phases to the circuit common node.

6. The flight control surface movement and damping control system of claim 5, wherein the electric motor system further comprises motor brake switch control logic electrically coupled to each motor brake switch and configured to selectively energize and de-energize each motor brake switch.

7. The flight control surface movement and damping control system of claim 6, wherein the motor brake switch control logic comprises:

enable logic configured to selectively supply a power source enable signal; and a motor brake switch power source coupled to receive the power source enable signal from the enable logic and electrically coupled to each of the motor brake switches, the motor brake switch power source configured, in response to receiving the power source enable signal, to energize each motor brake switch.

8. The flight control surface movement and damping control system of claim 7, wherein:

the enable logic is adapted to receive an enable signal and is configured, upon receipt of the motor brake enable signal, to supply the power source enable signal; and the motor brake switch power source is further configured, in response to receiving the power source enable signal, to energize each motor brake switch.

9. The flight control surface movement and damping control system of claim 5, further comprising an inverter power source electrically coupled to the high-side voltage node and the circuit common node.

10. The flight control surface movement and damping control system of claim 5, further comprising a gearbox coupled between the multi-phase motor and the flight control surface.

\* \* \* \* \*